United States Patent
Wu

(10) Patent No.: US 11,989,015 B2
(45) Date of Patent: May 21, 2024

(54) METHOD AND DEVICE FOR DETECTING OPEN AND CLOSED STATES OF PLATEN COVER PLATE OF IMAGE READING APPARATUS

(71) Applicant: ZHUHAI PANTUM ELECTRONICS CO., LTD., Guangdong (CN)

(72) Inventor: Weixin Wu, Guangdong (CN)

(73) Assignee: ZHUHAI PANTUM ELECTRONICS CO., LTD., Guangdong (CN)

( * ) Notice: Subject to any disclaimer, the term of this patent is extended or adjusted under 35 U.S.C. 154(b) by 160 days.

(21) Appl. No.: 17/899,870

(22) Filed: Aug. 31, 2022

(65) Prior Publication Data
US 2023/0069903 A1   Mar. 9, 2023

(30) Foreign Application Priority Data

Sep. 1, 2021   (CN) .......................... 202111019762.2

(51) Int. Cl.
   *G05B 23/02*   (2006.01)
   *H04N 23/51*   (2023.01)

(52) U.S. Cl.
   CPC ......... *G05B 23/0259* (2013.01); *H04N 23/51* (2023.01)

(58) Field of Classification Search
   CPC .. H04N 1/04; H04N 1/00814; H04N 1/00835; H04N 1/00525; H04N 23/51; G05B 23/0259

(Continued)

(56) References Cited

U.S. PATENT DOCUMENTS 7,471,424 B2 * 12/2008 Ishido ................ H04N 1/00713
                                                              358/449
8,610,982 B2 * 12/2013 Tsunoda ................ H04N 1/407
                                                              358/518

(Continued)

FOREIGN PATENT DOCUMENTS

CN          1525240        9/2004
CN         102487428       6/2012

(Continued)

OTHER PUBLICATIONS

Office action for Chinese Patent Application No. 2021110197622 dated Oct. 24, 2023.

*Primary Examiner* — Pritham D Prabhakher
(74) *Attorney, Agent, or Firm* — Carlson, Gaskey & Olds, P.C.

(57) ABSTRACT

Provided is a method and a device for detecting open and closed states of a platen cover plate of an image reading apparatus. The method includes: controlling a scanning element to scan light at an edge of a platen to obtain a signal value representing a light intensity; determining whether an absolute difference value between the signal value and a preset standard value is greater than a preset tolerance value; sending a prompt signal to prompt a user to close the platen cover plate in response to the absolute difference value being greater than the preset tolerance value; and continuing to perform scanning work on a manuscript on the platen in response to the absolute difference value being not greater than the preset tolerance value. The influence on quality of the scanned image due to incomplete closing of the platen cover plate is prevented.

18 Claims, 6 Drawing Sheets

(58) Field of Classification Search
USPC .......................................................... 348/373
See application file for complete search history.

(56) References Cited

U.S. PATENT DOCUMENTS

| | | | | |
|---|---|---|---|---|
| 9,118,784 | B2* | 8/2015 | Edwards | H04N 1/00551 |
| 9,628,657 | B2* | 4/2017 | Hamaguchi | H04N 1/00798 |
| 9,888,142 | B2* | 2/2018 | Kusuhata | H04N 1/00734 |
| 10,341,521 | B2* | 7/2019 | Kusuhata | H04N 1/00814 |
| 10,356,269 | B2* | 7/2019 | Shimizu | H04N 1/00816 |
| 2006/0171726 | A1* | 8/2006 | Noda | H04N 1/00405 |
| | | | | 399/16 |
| 2012/0140298 | A1* | 6/2012 | Tsunoda | H04N 1/6033 |
| | | | | 358/518 |
| 2015/0009518 | A1* | 1/2015 | Kashiwagi | H04N 1/00755 |
| | | | | 358/1.13 |
| 2015/0312437 | A1* | 10/2015 | Hamaguchi | H04N 1/00798 |
| | | | | 358/474 |
| 2017/0034386 | A1* | 2/2017 | Kusuhata | H04N 1/10 |
| 2018/0284672 | A1* | 10/2018 | Saeda | H04N 1/32122 |

FOREIGN PATENT DOCUMENTS

| | | |
|---|---|---|
| CN | 104427195 | 3/2015 |
| JP | 2001197269 | 7/2001 |
| JP | 2007028185 | 2/2007 |

\* cited by examiner

METHOD AND DEVICE FOR DETECTING OPEN AND CLOSED STATES OF PLATEN COVER PLATE OF IMAGE READING APPARATUS

CROSS-REFERENCE TO RELATED APPLICATIONS

The present application claims priority to Chinese Patent Application No. 202111019762.2, filed on Sep. 1, 2021, the content of which is incorporated herein by reference in its entirety.

TECHNICAL FIELD

The present disclosure relates to the field of scanning technologies and, in particular, to a method and a device for detecting open and closed states of a platen cover plate of an image reading apparatus.

BACKGROUND

An image reading apparatus installed in imaging devices such as copiers, printers, facsimile machines, and the like can generate an electrical image data through reflected light of an original manuscript obtained by irradiating reading light emitted by the light source of the scanner to a manuscript placed on contact glass, and perform a process such as imaging.

When reading the manuscript, situations such as external light from the outside of the device being incident on a surface of the manuscript or the reading light leaking to the outside may result in incorrect reading or reduce the quality of the read image. Therefore, the pressing plate which can be open and closed on the contact glass needs to be closed in time during reading to shield external light and prevent the reading light from leaking outside. In order to solve this problem in the related art, a dedicated sensor is added to detect the opening and closing of a platen cover plate. However, this method violates the existing requirements for reducing the size of the image reading apparatus, leads to an increase of the number of components and the assembling steps, and thus increases the manufacturing cost.

SUMMARY

In view of this, embodiments of the present disclosure provide a method and device for detecting open and closed states of a platen cover plate of an image reading apparatus, to solve the technical problem in the related art that the image reading apparatus will be affected by the incident external light and the leaking of the reading light when reading and result in incorrect reading or decreasing the quality of the read image.

In a first aspect, an embodiment of the present disclosure provides a method for detecting open and closed states of a platen cover plate of an image reading apparatus, including: controlling a scanning element to scan light at an edge of a platen to obtain a signal value representing a light intensity; determining whether an absolute difference value between the signal value and a preset standard value is greater than a preset tolerance value; sending a prompt signal to prompt a user to close the platen cover plate in response to the absolute difference value being greater than the preset tolerance value; and continuing to perform scanning work on a manuscript on the platen in response to the absolute difference value being not greater than the preset tolerance value.

With the solution provided in this embodiment, the internal light of the image reading apparatus can be detected by using the scanning element provided in the image reading apparatus, and the open and closed states of the platen cover plate can be detected without providing additional sensors. When the entry amount of ambient light is so large that the quality of the scanned image on the platen is affected, the user can be promoted to close the platen cover plate to prevent the quality of the scanned image from being decreased.

In an embodiment, said controlling a scanning element to scan light at an edge of a platen to obtain a signal value representing a light intensity includes: controlling the scanning element to scan light close to a left edge of an initial position of the scanning element on the platen; generating an analog signal based on the light; converting the analog signal into a digital signal; and obtaining the signal value based on the digital signal.

With the solution provided in this embodiment, the open and closed states of the platen cover plate can be directly detected by detecting the light closest to the left edge of the initial position of the scanning element on the platen without moving the scanning element, thereby simplifying operation and saving time of signal acquisition. The detected light is represented by a digital signal by means of A/D conversion. It can be determined whether the entry amount of light has already reached a level enough to affect the quality of the scanned image from the value of the digital signal.

In an embodiment, the preset standard value is set as follows: when the platen cover plate of the image reading apparatus is in a closed state, an average value of optical signal values obtained by the scanning element through multiple times of scanning is taken as a first signal average value, and the first signal average value is the preset standard value.

With the solution provided in this embodiment, the detected digital signal of the internal light of the image reading apparatus when not affected by the ambient light is taken as a criterion for determining the entry amount of the ambient light when the image reading apparatus is working. With multiple times of detection and calculation, the obtained preset standard value can more accurately reflect the lightness and darkness of the internal light of the image reading apparatus in case the platen cover plate is in a closed state, so as to more accurately determine whether the entry amount of the ambient light is enough to affect the determination of the quality of the scanned image.

In an embodiment, the preset tolerance value is set as follows: when the platen cover plate of the image reading apparatus is in an open state and opened at a preset angle, an average value of optical signal values obtained by the scanning element through multiple times of scanning is taken as a second signal average value, and an absolute difference value between the preset standard value and the second signal average value is taken as the preset tolerance value.

With the solution provided in this embodiment, the detected digital signal of the internal light of the image reading apparatus when affected by the ambient light is taken as another criterion for determining the entry amount of the ambient light when the image reading apparatus is working. With multiple times of detection and calculation, the obtained second signal average value can more accurately reflect the lightness and darkness of the internal light of the image reading apparatus when the platen cover plate is in an open state and opened at a certain angle, so as to more accurately determine whether the entry amount of the ambient light is enough to affect the determination of the quality of the scanned image.

In an embodiment, the preset angle is an angle when the second signal average value has a smallest measurement error during measurement.

With the solution according to this embodiment, the determination of the entry amount of ambient light can be more accurate and sensitive, so as to prompt the user that too much ambient light enters the image reading apparatus and causes quality problems in the scanned image before the platen cover plate is closed.

In an embodiment, the prompt signal includes at least one of prompt information displayed on a display panel of the image reading apparatus, prompt information broadcasted by voice, prompt information displayed by a light source, or any combinations thereof.

With the solution provided in this embodiment, one or any combination of visual, auditory or warning methods has a function of prompting the user to close the platen cover plate in time when the entry amount of the ambient light is enough to affect the quality of the scanned image.

In a second aspect, an embodiment of the present disclosure provides a device for detecting open and closed states of a platen cover plate of an image reading apparatus, including: at least one processor; and a memory configured to store instructions executable by the at least one processor. The instructions cause the at least one processor to: control a scanning element to scan light at an edge of a platen to obtain a signal value representing a light intensity; determine whether an absolute difference value between the signal value and a preset standard value is greater than a preset tolerance value; and send a prompt signal to prompt a user to close the platen cover plate.

With the solution provided in this embodiment, the internal light of the image reading apparatus can be detected by using the scanning element provided in the image reading apparatus through the control module, and the open and closed states of the platen cover plate can be detected through the calculation module without providing additional sensors. When the entry amount of ambient light is so large that the quality of the scanned image on the platen is affected, the calculation module can prompt the user to close the platen cover plate to prevent the quality of the scanned image from being decreased.

In an embodiment, the at least one processor is further configured to: control the scanning element to scan light close to a left edge of an initial position of the scanning element on the platen; generate an analog signal based on the light; convert the analog signal into a digital signal; and obtain the signal value based on the digital signal.

In an embodiment, the preset standard value is set as follows: when the platen cover plate of the image reading apparatus is in a closed state, an average value of optical signal values obtained by the scanning element through multiple times of scanning is taken as a first signal average value, and the first signal average value is the preset standard value.

In an embodiment, the preset tolerance value is set as follows: when the platen cover plate of the image reading apparatus is in an open state and opened at a preset angle, an average value of optical signal values obtained by the scanning element through multiple times of scanning is taken as a second signal average value, and an absolute difference value between the preset standard value and the second signal average value is taken as the preset tolerance value.

In an embodiment, the preset angle is an angle when the second signal average value has a smallest measurement error during measurement.

In an embodiment, the prompt signal includes at least one of prompt information displayed on a display panel of the image reading apparatus, prompt information broadcasted by voice, prompt information displayed by a light source, or any combinations thereof.

In a third aspect, an embodiment of the present disclosure provides an image reading apparatus including the device according to the second aspect.

In a fourth aspect, an embodiment of the present disclosure provides a computer-readable storage medium including a program or an instruction. The method according to the first aspect is executed when running the program or the instruction on a computer.

According to the method according to the embodiments of the present disclosure, the photosensitive sensor on the scanning element of the image reading apparatus is used for detecting the opening and closed state of the platen cover plate, so that on one hand, the influence on the quality of the scanned image due to incomplete closing of the platen cover plate is prevented, and on the other hand, an additional sensor is not needed, and the cost is reduced.

BRIEF DESCRIPTION OF DRAWINGS

In order to better illustrate the technical solutions of the embodiments according to the present disclosure, the following briefly introduces the drawings that are used in the embodiments. It is appreciated that, the drawings in the following description are only some embodiments of the present disclosure. For those skilled in the art, other drawings can also be obtained from these drawings without any creative effort.

REFERENCE SIGNS

1—platen cover plate; 2—scanning element; 3—platen; 4—photosensitive sensor; 5—light source; 6—lens group device; 7—lens; 8—illuminator; 9—lens array; 10—control module; 11—calculation module; 12—prompt module.

DESCRIPTION OF EMBODIMENTS

In order to better understand the technical solutions of the present disclosure, the embodiments of the present disclosure will be described in detail below with reference to the accompanying drawings.

It should be understood that the described embodiments are only some but not all embodiments of the present disclosure. Based on the embodiments in the present disclosure, all other embodiments obtained by those skilled in the art without any creative efforts shall fall within the protection scope of the present disclosure.

In an embodiment of the present disclosure, the image reading apparatus is an apparatus with at least one function related to image reading. The above-mentioned function related to image reading may include, but is not limited to, a scanning function.

In order to facilitate description, a scanning device is taken as an example for description in the following embodiments.

An embodiment of the present disclosure discloses a method for detecting open and closed states of the platen cover plate of image reading apparatus, which can detect the open and closed states of the platen cover plate 1. When the amount of ambient light irradiating into the image reading apparatus is too large, the user can be promoted in time to close the platen cover plate 1 without adding additional elements.

Figure 1:
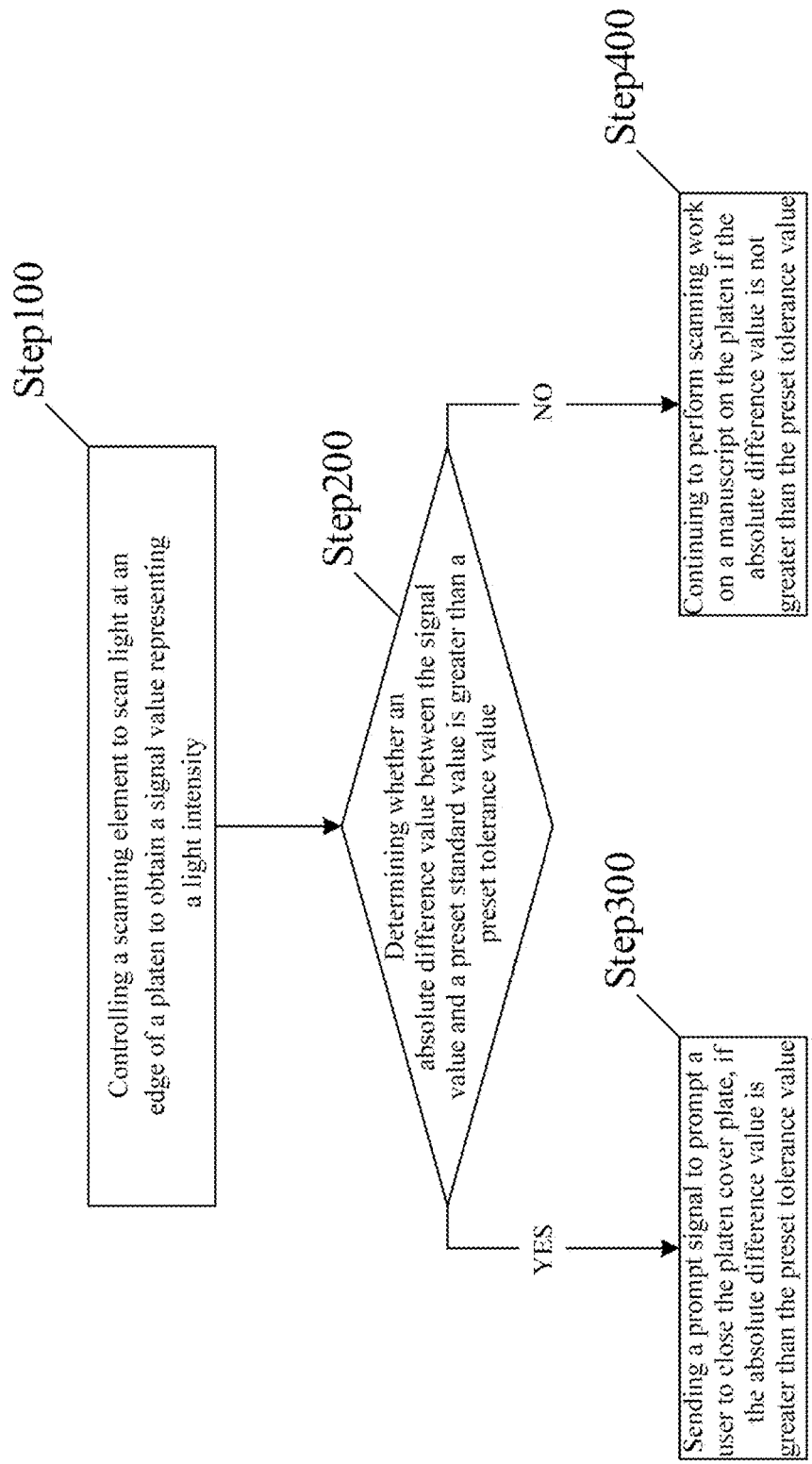
FIG. 1 is a flow chart of a detection method according to an embodiment of the present disclosure.

As shown in FIG. 1, the detection method according to an embodiment of the present disclosure includes:

Step 100: Controlling a scanning element 2 to scan light at an edge of a platen 3 to obtain a signal value representing a light intensity;

Step 200: Determining whether an absolute difference value between the signal value and a preset standard value is greater than a preset tolerance value;

Step 300: Sending a prompt signal to prompt a user to close the platen cover plate 1, based on that the absolute difference value is greater than the preset tolerance value; and Step 400: Continuing to perform scanning work on a manuscript on the platen 3 based on that the absolute difference value is not greater than the preset tolerance value.

In order to solve the above technical problem, in the detection method according to this embodiment a photosensitive sensor 4 (such as a CCD (Charge Couple Device), or a CIS (Contact Image Sensor)) on the scanning element 2 is used to detect the edge of platen 3 to determine whether platen cover plate 1 is closed. When the platen cover plate 1 is opened, the ambient light enters the scanning element 2. An analog signal is generated by the photosensitive sensor 4 through the photoelectric effect, and converted into a digital signal through an A/D (Analog to Digital) converter. Then the digital signal is transmitted to the image reading apparatus, and the image reading apparatus determines whether the platen cover plate 1 is closed according to the received digital signal.

Figure 2:
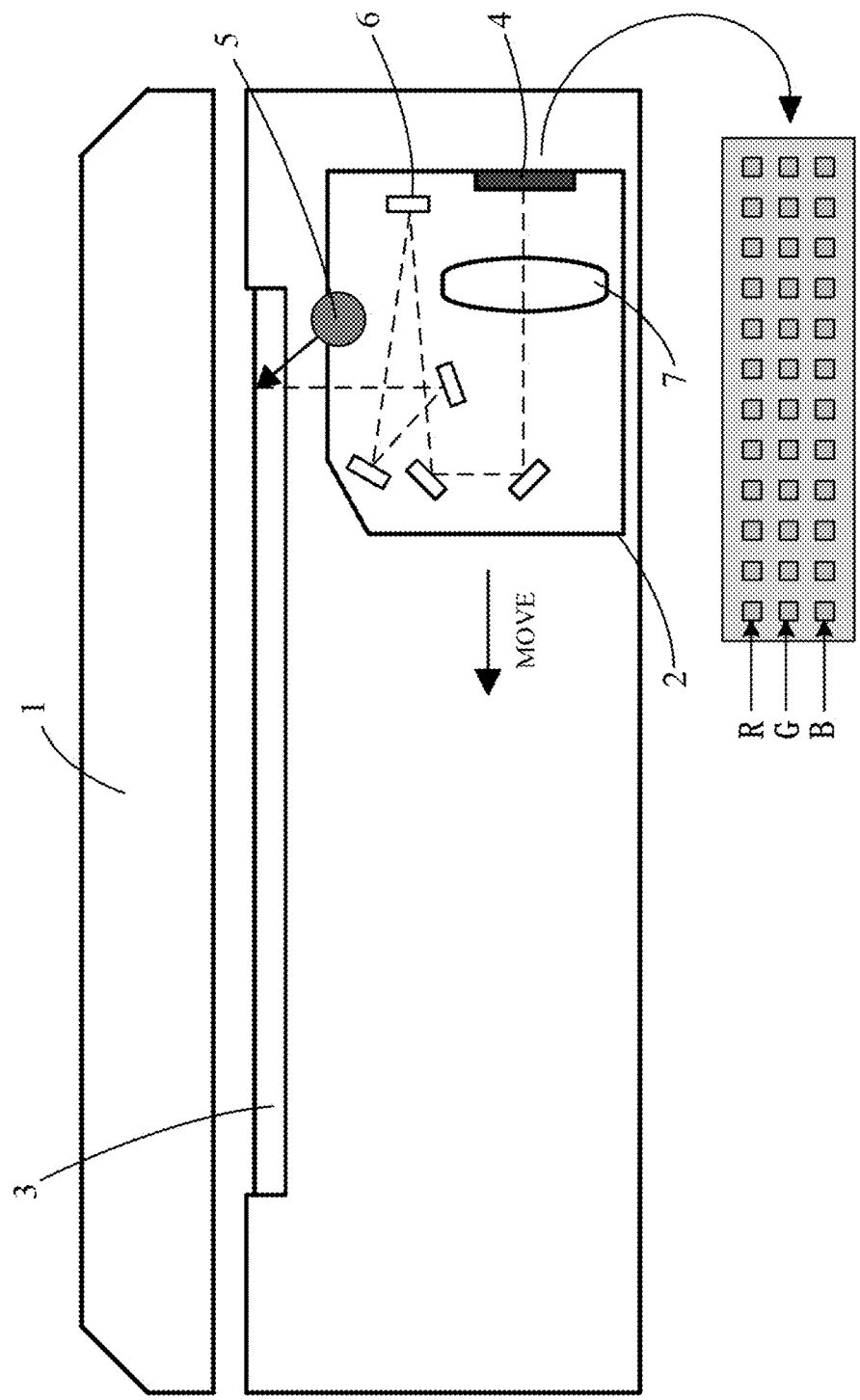
FIG. 2 is a schematic diagram of a partial structure of an image reading apparatus in case a scanning element is CCD in the detection method according to an embodiment of the present disclosure.
Figure 3:
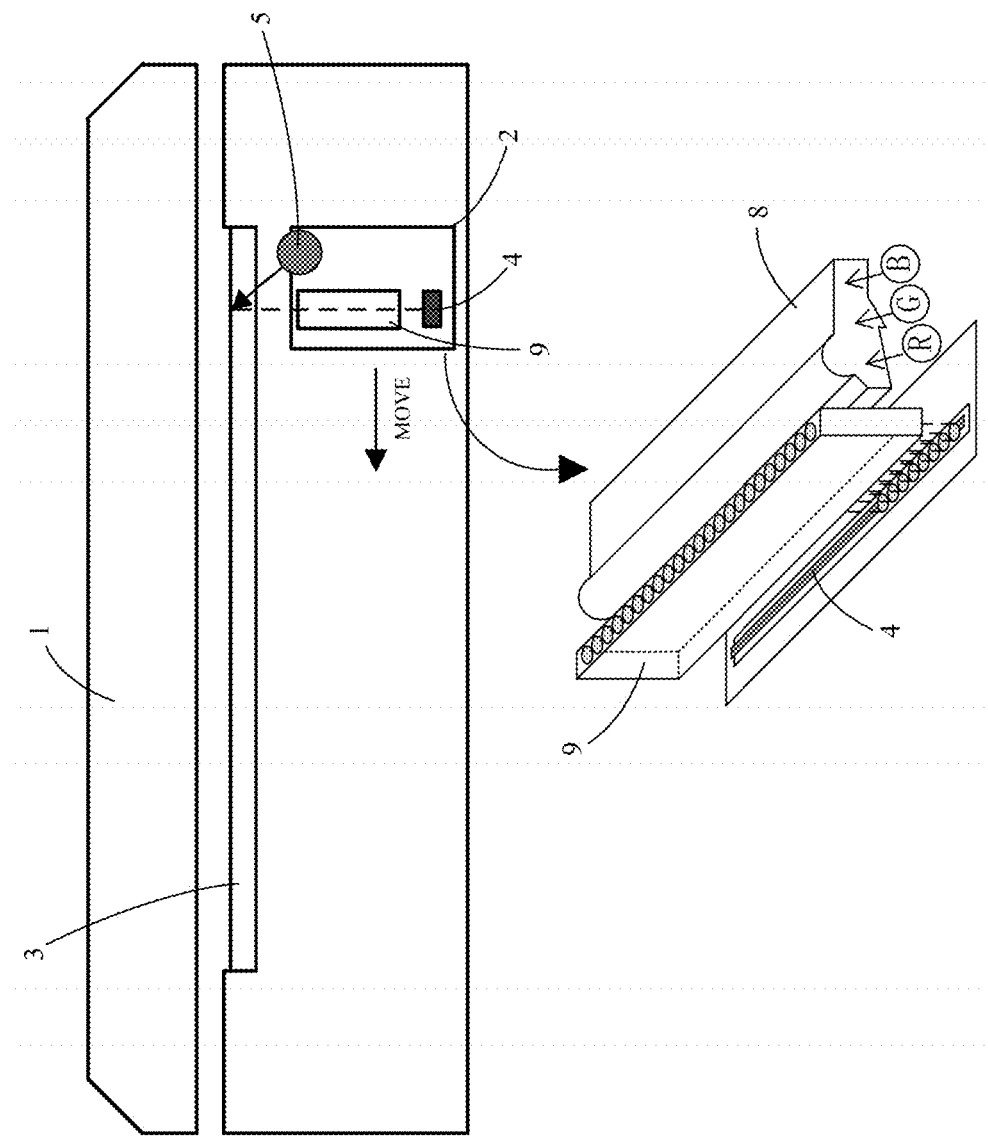
FIG. 3 is a schematic diagram of a partial structure of an image reading apparatus in case a scanning element is CIS in the detection method according to an embodiment of the present disclosure.

A partial internal structure of the image reading apparatus are shown in FIGS. 2 and 3. FIG. 2 is a schematic diagram of a partial internal structure of an image reading apparatus when detecting the internal light in case the photosensitive sensor 4 in the scanning element 2 is CCD. FIG. 3 is a schematic diagram of a partial internal structure of an image reading apparatus when detecting the internal light in case the photosensitive sensor 4 in the scanning element 2 is CIS. As shown in FIG. 2, the CCD in the scanning element 2 (i.e., photosensitive sensor 4 in FIG. 2) uses a fluorescent lamp or the like as the light source 5 of the CCD. The light source 5 irradiates on the manuscript on the platen 3. The reflected light is reflected to a lens 7 through a set of lens group device 6. The lens 7 focuses the light into the photosensitive sensor 4. An analog signal is generated by the photosensitive sensor 4 a through the photoelectric effect, and converted into a digital signal through an A/D converter. As shown in FIG. 3, the CIS in scanning element 2 (i.e., photosensitive sensor 4 in FIG. 3) uses an illuminator 8 of three colors (RGB) as the light source 5 of the CIS. The illuminator 8 may be a light-emitting diode. The light emitted by the illuminator 8 irradiates the manuscript on the platen 3, and the reflected light is directly focused into the CIS (i.e., photosensitive sensor 4) through a lens array 9. An analog signal is generated by the CIS (i.e., photosensitive sensor 4) through the photoelectric effect, and converted to a digital signal by the A/D converter.

In the detection method, the scanning element 2 provided in the image reading apparatus is used to detect the internal light at the edge of the image reading apparatus platen 3, the open and closed states of the platen cover plate 1 can be detected without providing additional sensors. When the amount of ambient light is so large that the quality of the scanned manuscript image on the platen 3 is affected, the user can be promoted to close the platen cover plate 1 to prevent the quality of the scanned image from being decreased.

Figure 4:
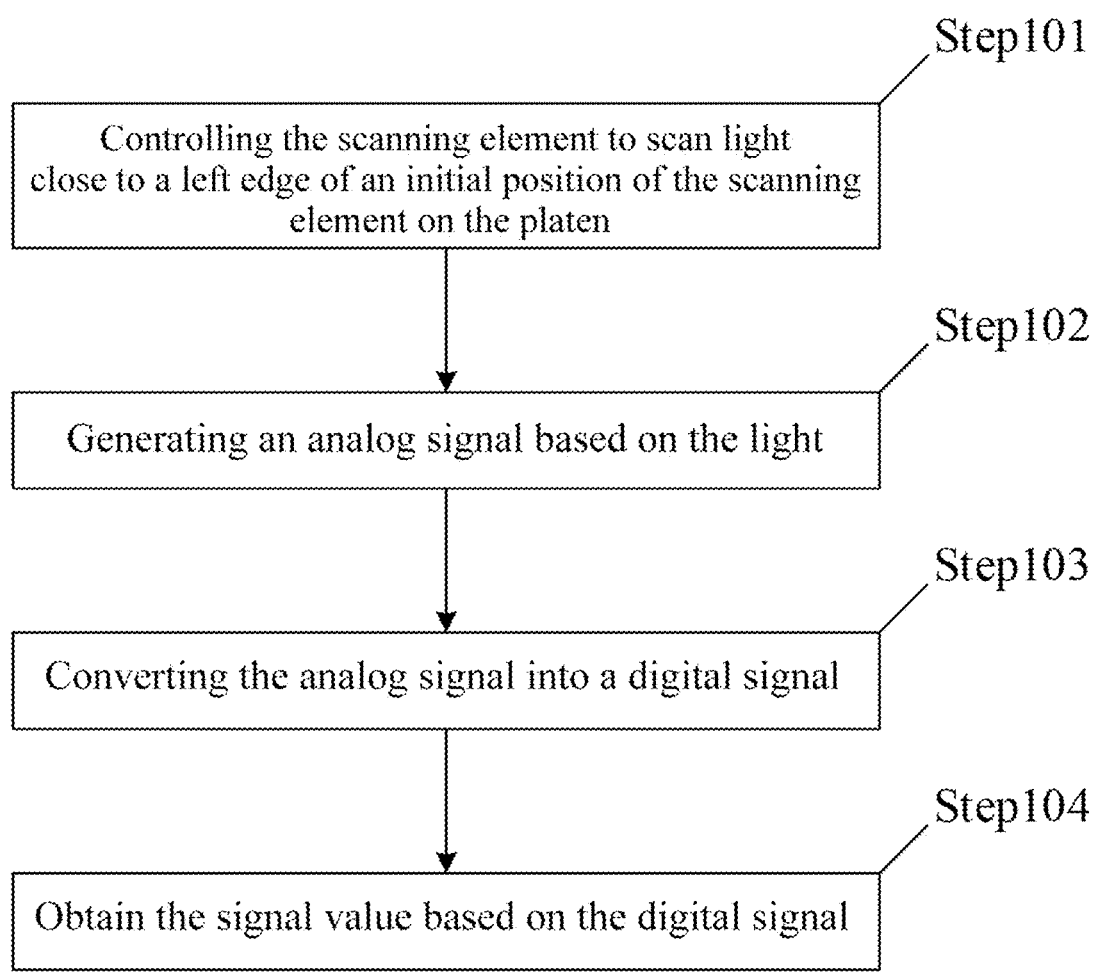
FIG. 4 is a flow chart of Step 100 in the detection method according to the embodiment of the present disclosure.

As shown in FIG. 4, in the detection method, the Step 100 further includes:

Step 101: Controlling the scanning element 2 to scan a light close to a left edge of an initial position of the scanning element 2 on the platen 3.

Step 102: Generating an analog signal based on the light.

Step 103: Converting the analog signal into a digital signal.

Step 104: Obtain the signal value based on the digital signal.

In the Step 100, the scanning element 2 in the image reading apparatus reads the edge of the platen 3. An analog signal is generated through the photoelectric effect, and then converted into a digital signal through the A/D converter. The scanning element 2 in the image reading apparatus reads the left edge of the platen 3 adjacent to its initial position. An analog signal is generated through the photoelectric effect, and then converted into a digital signal through the A/D converter. Compared with reading the edge positions at other positions of the platen 3, reading the edge of the platen 3 adjacent to the initial position of the photosensitive sensor 4 allows the user to detect the open and closed states of the platen cover plate 1 without moving the position of the photosensitive sensor 4, thereby simplifying operation and saving time of signal acquisition.

In the detection method, the open and closed states of the platen cover plate 1 can be directly detected by detecting the light closest to the left edge of the initial position of the scanning element on the platen 3 without moving the scanning element 2, thereby simplifying operation and saving time of signal acquisition. The detected light is represented by a digital signal by means of A/D conversion. It can be determined whether the entry amount of light has already reached a level enough to adversely affect the quality of the scanned image from the value of the digital signal.

In the Step 200 of the detection method, the preset standard value is set as follows: in case the platen cover plate 1 of the image reading apparatus is in a closed state, an average value of signal values obtained by scanning for multiple times by the scanning element is taken as a first signal average value, and the first signal average value is regarded as the preset standard value. The preset standard value is measured and calculated for multiple times and saved by the image reading apparatus before leaving the factory. The first signal average value of the signal values of multiple sets of digital signals detected and outputted by the corresponding photosensitive sensor 4 when the platen cover plate 1 is closed for multiple times is taken as the standard value and saved to the image reading apparatus as the preset standard value.

In the detection method, the detected digital signal of the internal light of the image reading apparatus when not affected by the ambient light is taken as a criterion for determining the entry amount of the ambient light when the image reading apparatus is working. With multiple times of detection and calculation, the obtained preset standard value can more accurately reflect the lightness and darkness of the internal light of the image reading apparatus when the platen cover plate 1 is in a closing state, so as to more accurately determine whether the entry amount of the ambient light is enough to affect the determination of the quality of the scanned image.

In the Step 200 of the detection method, the preset tolerance value is as follows: in case the platen cover plate 1 of the image reading apparatus is in an open state and opened at a preset angle, the average value of a plurality of optical signal values obtained by scanning for multiple times by the scanning element 2 is taken as a second signal average value, and an absolute difference value of the preset standard value and the second signal average value is taken as the preset tolerance value. The preset tolerance value is an empirical value measured and calculated for many times and saved by the image reading apparatus before leaving the factory. The absolute value of the difference between the second signal average value of multiple sets of signal values detected and outputted by the photosensitive sensor 4 when the platen cover plate 1 is opened at the same certain angle for multiple times and the preset standard value previously saved is saved to the image reading apparatus as the preset tolerance value.

In the detection method, the detected digital signal of the internal light of the image reading apparatus when affected by the ambient light is taken as another criterion for determining the entry amount of the ambient light when the image reading apparatus is working. With multiple times of detection and calculation, the obtained second signal average value can more accurately reflect the lightness and darkness of the internal light of the image reading apparatus when the platen cover plate is in an open state and opened at a certain angle, so as to more accurately determine whether the entry amount of the ambient light is enough to affect the determination of the quality of the scanned image.

In the Step 200 of the detection method, the preset angle is the second signal average value with a smallest measurement error during measurement. That is, when pre-testing the second signal average value before the image reading apparatus leaves the factory, the certain angle at which the platen cover plate 1 is opened is the preset angle corresponding to the minimum error determined through multiple measurements and calculations before leaving the factory.

In the detection method it can be more accurate and sensitive in determining the entry amount of ambient light, avoiding excessive ambient light from entering the image reading apparatus and causing quality problems in the scanned image, before prompting the user to close the platen cover plate 1.

In the Step 200, before the user starts to perform scanning, the image reading apparatus first reads the saved preset standard value and preset tolerance value, then calculates the absolute difference value between the current signal value of the digital signal detected by the photosensitive sensor 4 and the read preset standard value, and further determines whether the obtained absolute difference value is greater than the read preset tolerance value. If the absolute difference value is not greater than the preset tolerance value, the scanning element 2 is controlled to perform scanning on the manuscript on the platen 3. If the absolute difference value is greater than the preset tolerance value, step 300 is executed, and the user is prompted to close the platen cover plate 1.

In the Step 300, when it is determined that the absolute difference value between the current signal value and the preset standard value is greater than the preset tolerance value, a prompt signal is sent to prompt the user to close the platen cover plate 1. In the detection method, the prompt signal includes at least one or any combination of prompt information displayed on a display panel of the image reading apparatus, broadcasted by voice, or displayed by emitting light. The prompt information displayed on the display panel of the image reading apparatus prompts the user to close the platen cover plate 1 through displaying relevant information on the panel, the prompt information broadcasted by the voice prompts the user to close the platen cover plate 1 through an AI (Artificial Intelligence) voice broadcast of the relevant information, and the prompt information displayed by emitting light prompts the user to close platen cover plate 1 through displaying by a light source such as LED (Light Emitting Diode). It is appreciated that, the prompt signal may be any one or any combination of the above three prompt signals. If any combination of the three prompt signals is used to prompt the user to close the platen cover plate 1, it can be avoided that the user fails to pay attention to the prompt information in case only one of the above three methods is used to prompt the user to close the platen cover plate 1. For example, in case the prompt signal is displayed on the display panel to prompt the user to close the platen cover plate 1, if the user does not understand the prompt function of the display panel, the prompt information may be ignored, and the user may be misled to believe that the scan can be performed such that the quality of the read scanned image is reduced. If the prompt signal displayed on the display panel is accompanied by an intelligent voice broadcast of the same prompt information or a flashing LED light source, the user can acknowledge the prompt signal through the voice or the flashing light source in time, even if he or she does not directly see the prompt signal displayed on the display panel, so as to close the platen cover plate 1 in time and prevent the quality of the scanned image from being decreased.

In the detection method, one or more combinations of visual, auditory or warning methods can play a role of prompting the user to close platen cover plate 1 in time when the entry amount of ambient light is enough to affect the quality of the scanned image.

Figure 5:
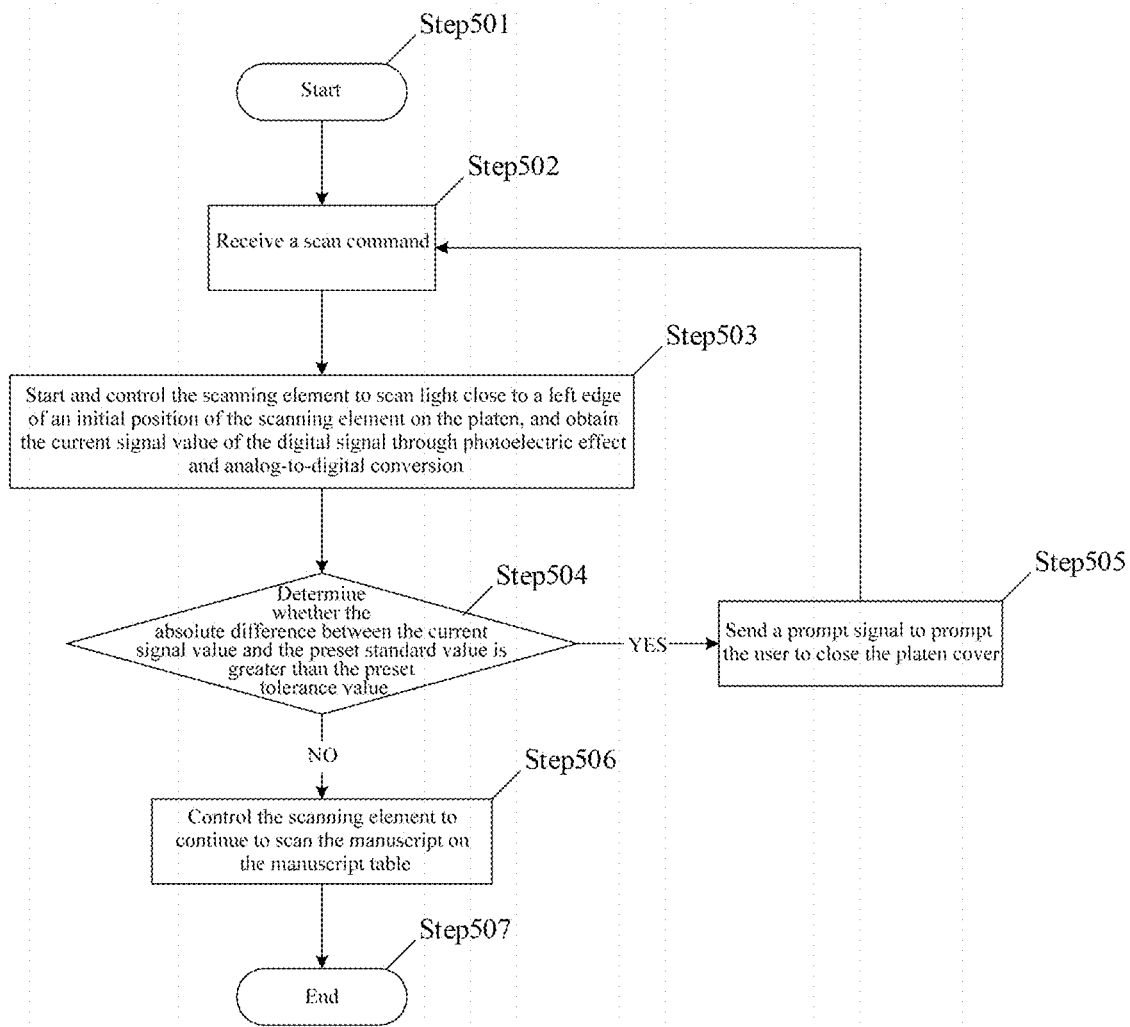
FIG. 5 is a flow chart of the detection method during actual work according to an embodiment of the present disclosure.

To sum up, the flow chart of the detection method during actual work for the open and closed states of the platen cover plate 1 of the image reading apparatus in this embodiment is shown in FIG. 5, and the details thereof are as follows:

Step 501: Start;
Step 502: Receive a scan command;
Step 503: Start and control the scanning element 2 to scan a light close to a left edge of an initial position of the scanning element 2 on the platen 3, and obtain the current signal value of the digital signal through photoelectric effect and analog-to-digital conversion;
Step 504: Determine whether the absolute difference between the current signal value and the preset standard value is greater than the preset tolerance value; if the determination result is yes, execute Step 505; and if the determination result is no, execute Step 506;

Step 505: Send a prompt signal to prompt the user to close the platen cover 1; and then return to execute the Step 502;

Step 506: Control the scanning element 2 to continue to scan the manuscript on the manuscript table 3;

Step 507: End.

Figure 6:
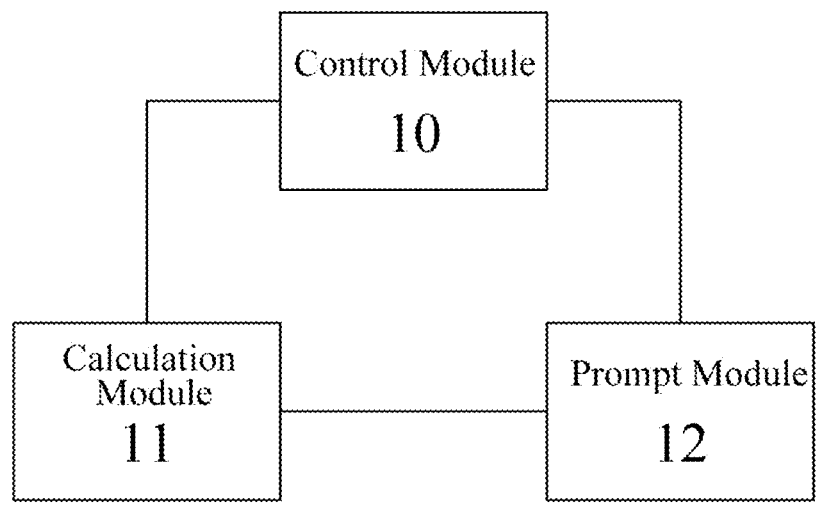
FIG. 6 is a schematic diagram of modules of a detection device according to an embodiment of the present disclosure.

FIG. 6 shows a detection device for detecting open and closed states of the platen cover plate of image reading apparatus according to an embodiment of the present disclosure. The detection device includes control module 10, a calculation module 11 and a prompt module 12 that communicate with one another.

In an example, the control module 10 is configured to control a scanning element 2 to scan light at an edge of a platen 3 to obtain a signal value representing a light intensity. The calculation module 11 is configured to determine whether an absolute difference value between the signal value and a preset standard value is greater than a preset tolerance value. The prompt module 12 is configured to send a prompt signal to prompt a user to close the platen cover plate 1.

In an example, in the detection device, the control module 10 controls the scanning element 2 to scan the edge of the platen 3, emits light to the edge of the platen 3 through the light source 5, reads the reflected light from the edge of the platen 3 by the photosensitive sensor 4, thereby detects the entry of the external light so as to obtain an analog signal with continuously changed time and amplitude through the photoelectric effect. Subsequently, the control module 10 converts the analog signal into a digital signal (discrete signal) represented by a binary value through the A/D converter, such as 00000101 (corresponding to signal value 5).

The calculation module 11 calculates the absolute difference value between the digital signal value obtained by the current scan and the preset standard value, and further determines whether the absolute difference value is greater than the preset tolerance value. In an example, in case the platen cover plate 1 is closed, the scanning element 2 scans the edge of the platen 3. That is, the light source 5 emits light to the edge of the platen 3 and the photosensitive sensor 4 reads the reflected light from the edge of the platen 3. At this time, the corresponding analog signal is obtained and converted into a digital signal through the A/D converter due to the photoelectric effect, while the calculation module 11 calculates the absolute difference value between the digital signal value obtained by the scan and the preset standard value, and can further determine the absolute difference value is not greater than the preset tolerance value. In case the platen cover plate 1 is opened at a certain angle, the scanning element 2 scans the edge of the platen 3. That is, the light source 5 emits light to the edge of the platen 3 and the photosensitive sensor 4 reads the reflected light from the edge of the platen 3. In this case, in addition to the light from light source 5, the reflected light from the edge of platen 3 also includes the external light entering the edge of platen 3 due to the fact that the platen cover plate 1 is opened at a certain angle. The corresponding analog signal is obtained and converted into a digital signal through the A/D converter due to the photoelectric effect. In this case, the digital signal obtained by the scan is affected by the external light and has a large difference with respect to the preset standard value. Therefore, at this time, the calculation module 11 calculates the absolute difference value between the digital signal value obtained by the scanning and the preset standard value. If the platen cover plate 1 is opened with a range within the preset angle, it can be further determined that the absolute difference value is still not greater than the preset tolerance value. However, if the platen cover plate 1 is opened with a range exceeding the preset angle, it can be further determined that the absolute difference value is greater than the preset tolerance value.

In an example, in case the scanning element 2 is controlled to scan the light at the edge of the platen 3 to obtain the signal value representing the light intensity, it is selected that the scanning element 2 is controlled to scan the light close to the left edge of the initial position of the scanning element 2 on the platen 3. The analog signal is generated based on the light and converted into digital signal through the A/D converter, and the corresponding signal value is obtained based on the digital signal. By selecting that the scanning element 2 is controlled to scan the light close to the left edge of the initial position of the scanning element 2 on the platen 3, the open and closed states of platen cover plate 1 can be directly detected without moving the scanning element 2, thereby simplifying operation and saving time of signal acquisition.

In case the platen cover plate 1 of the image reading apparatus is in the closed state, signal values are obtained by scanning the edge of the platen 3 for multiple times by controlling the scanning element 2, and the average value of the signal values is calculated and taken as the first signal average value, that is, the preset standard value. In case the platen cover plate 1 of the image reading apparatus is in the open state and opened at the preset angle, signal values are obtained by scanning the edge of the platen 3 for multiple times by controlling the scanning element 2, the average value of the signal values is calculated and taken as the second signal average value, and the absolute difference value between the second signal average value and the preset standard value is calculated and taken as the preset tolerance value. It is appreciated that, the preset angle is a corresponding empirical angle with the smallest error determined through many experiments.

If it is determined that the absolute difference value is greater than the preset tolerance value, a prompt signal is sent to prompt the user to close the platen cover plate 1. In the detection device, the prompt signal includes at least one or any combination of prompt information displayed on a display panel of the image reading apparatus, broadcasted by voice, or displayed by emitting light. The prompt information displayed on the display panel of the image reading apparatus prompts the user to close the platen cover plate 1 through displaying relevant information on the panel, the prompt information broadcast by voice prompts the user to close the platen cover plate 1 through broadcasting the relevant information by the intelligent voice, and the prompt information displayed by emitting light prompts the user to close the platen cover plate 1 through displaying by a light source such as LED. It is appreciated that, the prompt signal may be any one or any combination of the above three prompt signals. If any combination of the three prompt signals is used to prompt the user to close the platen cover plate 1, it can be avoided that the user fails pay attention to the prompt information in case only one of the above three methods is used to prompt the user to close the platen cover plate 1. For example, in case the prompt signal is displayed on the display panel to prompt the user to close the platen cover plate 1, if the user does not understand the prompt function of the display panel, the prompt information may be ignored, and the user may be misled to believe that the scan can be performed such that the quality of the read scanned image is reduced. If the prompt signal displayed on the display panel is accompanied by an intelligent voice broadcast of the same prompt information or a flashing LED light source, the user can acknowledge the prompt signal through the voice or the flashing light source in time, even if he or she does not see the prompt signal displayed on the display panel, so as to close the platen cover plate 1 in time and prevent the quality of the scanned image from being decreased.

If the absolute difference value is not greater than the preset tolerance value, the scanning element 2 is controlled to perform scanning on the manuscript on the platen 3.

According to the detection device, the control module 10 detects the internal light of the image reading apparatus by using the scanning element 2 of the image reading apparatus. The calculation module 11 can realize the detection of the open and closed states of the platen cover plate 1 without providing additional sensors. In case the entry amount of ambient light is so large that the scanning quality on the platen 3 is affected, the prompt module 12 can prompt the user to close the platen cover plate 1, so as to avoid the quality of the scanned image from being decreased.

An embodiment of the present disclosure further provides an image reading apparatus including the device described as above.

An embodiment of the present disclosure further provides a computer-readable storage medium including a program or an instruction. The method described as above in embodiments of the present disclosure is executed when running the program or the instructions on a computer.

In the above-mentioned embodiments, it may be implemented in entirety or in part by software, hardware, firmware or any combination thereof. When implemented in software, it can be implemented in entirety or in part in the form of a computer program product. The computer program product includes computer instructions. When the computer instructions are loaded and executed on a computer, the processes or functions described in accordance with the embodiments of the present disclosure result in whole or in part. The computer may be a general purpose computer, special purpose computer, computer network, or other programmable device. The computer instructions may be stored in or transmitted from one computer-readable storage medium to another computer-readable storage medium, for example, the computer instructions may be downloaded from a website site, computer, server, or data center. The transmission is carried out to another website site, computer, server or data center by wire (e.g., coaxial cable, optical fiber, Digital Subscriber Line (DSL)) or wireless (e.g., infrared, wireless, microwave, etc.). The computer-readable storage medium can be any available medium that can be accessed by a computer or a data storage device such as a server, a data center, or the like that includes an integration of one or more available media. The available media may be magnetic media (e.g., floppy disks, hard disks, magnetic tapes), optical media (e.g., high-density Digital Video Discs (DVD)), or semiconductor media (e.g., Solid State Disks (SSD)) etc.

According to the method and device for detecting the open and closed states of the platen cover plate of the image reading apparatus disclosed in the embodiments of the present disclosure, the photosensitive sensor on the scanning element of the image reading apparatus is used for detecting the opening and closing state of the platen cover plate, so that on one hand, the influence on the quality of the scanned image due to incomplete closing of the platen cover plate is prevented, and on the other hand, an additional sensor is not needed, and thus the cost is reduced.

Those skilled in the art can realize that the units and algorithm steps of each example described in conjunction with the embodiments disclosed herein can be implemented through electronic hardware, computer software, or a combination thereof. In order to illustrate the interchangeability of the hardware and the software, the above description has generally described the components and steps of each example in terms of function. Whether these functions are performed in hardware or software depends on the specific application and design constraints of the technical solution. Those skilled in the art may use different methods to implement the described functionality for each particular application, while such implementations should not be considered as going beyond the scope of the present disclosure.

The above are only preferred embodiments of the present disclosure, and are not intended to limit the present disclosure. Any modifications, equivalent replacements, improvements, etc. made within the spirit and principles of the present disclosure shall be included within the scope of the protection of the present disclosure.

What is claimed is:

1. A method for detecting open and closed states of a platen cover plate of an image reading apparatus, comprising:
    controlling a scanning element to scan light at an edge of a platen to obtain a signal value representing a light intensity;
    determining whether an absolute difference value between the signal value and a preset standard value is greater than a preset tolerance value;
    sending a prompt signal to prompt a user to close the platen cover plate in response to the absolute difference value being greater than the preset tolerance value; and
    continuing to perform scanning work on a manuscript on the platen in response to the absolute difference value being not greater than the preset tolerance value.

2. The method according to claim 1, wherein said controlling a scanning element to scan light at an edge of a platen to obtain a signal value representing a light intensity comprises:
    controlling the scanning element to scan light close to a left edge of an initial position of the scanning element on the platen;
    generating an analog signal based on the light;
    converting the analog signal into a digital signal; and
    obtaining the signal value based on the digital signal.

3. The method according to claim 1, wherein the preset standard value is set as follows:
    when the platen cover plate of the image reading apparatus is in a closed state, an average value of optical signal values obtained by the scanning element through multiple times of scanning is taken as a first signal average value, and the first signal average value is the preset standard value.

4. The method according to claim 1, wherein the preset tolerance value is set as follows:
    when the platen cover plate of the image reading apparatus is in an open state and opened at a preset angle, an average value of optical signal values obtained by the scanning element through multiple times of scanning is taken as a second signal average value, and an absolute difference value between the preset standard value and the second signal average value is taken as the preset tolerance value.

5. The method according to claim 4, wherein the preset angle is an angle when the second signal average value has a smallest measurement error during measurement.

6. The method according to claim 1, wherein the prompt signal comprises at least one of prompt information displayed on a display panel of the image reading apparatus, prompt information broadcasted by voice, prompt information displayed by a light source, or any combinations thereof.

7. A device for detecting open and closed states of a platen cover plate of an image reading apparatus, comprising:
at least one processor; and
a memory configured to store instructions executable by the at least one processor;
wherein the instructions cause the at least one processor to:
control a scanning element to scan light at an edge of a platen to obtain a signal value representing a light intensity;
determine whether an absolute difference value between the signal value and a preset standard value is greater than a preset tolerance value; and
send a prompt signal to prompt a user to close the platen cover plate.

8. The device according to claim 7, wherein the at least one processor is further configured to:
control the scanning element to scan light close to a left edge of an initial position of the scanning element on the platen;
generate an analog signal based on the light;
convert the analog signal into a digital signal; and
obtain the signal value based on the digital signal.

9. The device according to claim 7, wherein the preset standard value is set as follows:
when the platen cover plate of the image reading apparatus is in a closed state, an average value of optical signal values obtained by the scanning element through multiple times of scanning is taken as a first signal average value, and the first signal average value is the preset standard value.

10. The device according to claim 7, wherein the preset tolerance value is set as follows:
when the platen cover plate of the image reading apparatus is in an open state and opened at a preset angle, an average value of optical signal values obtained by the scanning element through multiple times of scanning is taken as a second signal average value, and an absolute difference value between the preset standard value and the second signal average value is taken as the preset tolerance value.

11. The device according to claim 10, wherein the preset angle is an angle when the second signal average value has a smallest measurement error during measurement.

12. The device according to claim 7, wherein the prompt signal comprises at least one of prompt information displayed on a display panel of the image reading apparatus, prompt information broadcasted by a voice, prompt information displayed by a light source, or any combinations thereof.

13. An image reading apparatus, comprising: a device for detecting open and closed states of a platen cover plate, wherein the device comprises:
at least one processor;
a memory configured to store instructions executable by the at least one processor;
wherein the instructions cause the at least one processor to:
control a scanning element to scan light at an edge of a platen to obtain a signal value representing a light intensity;
determine whether an absolute difference value between the signal value and a preset standard value is greater than a preset tolerance value; and
send a prompt signal to prompt a user to close the platen cover plate.

14. The apparatus according to claim 13, wherein the at least one processor is further configured to:
control the scanning element to scan light close to a left edge of an initial position of the scanning element on the platen;
generate an analog signal based on the light;
convert the analog signal into a digital signal; and
obtain the signal value based on the digital signal.

15. The apparatus according to claim 13, wherein the preset standard value is set as follows:
when the platen cover plate of the image reading apparatus is in a closed state, an average value of optical signal values obtained by the scanning element through multiple times of scanning is taken as a first signal average value, and the first signal average value is the preset standard value.

16. The apparatus according to claim 13, wherein the preset tolerance value is set as follows:
when the platen cover plate of the image reading apparatus is in an open state and opened at a preset angle, an average value of optical signal values obtained by the scanning element through multiple times of scanning is taken as a second signal average value, and an absolute difference value between the preset standard value and the second signal average value is taken as the preset tolerance value.

17. The apparatus according to claim 16, wherein the preset angle is an angle when the second signal average value has a smallest measurement error during measurement.

18. The apparatus according to claim 13, wherein the prompt signal comprises at least one of prompt information displayed on a display panel of the image reading apparatus, prompt information broadcasted by a voice, prompt information displayed by a light source, or any combinations thereof.

* * * * *